United States Patent [19]

Bossen et al.

[11] 3,893,071

[45] July 1, 1975

[54] MULTI LEVEL ERROR CORRECTION SYSTEM FOR HIGH DENSITY MEMORY

[75] Inventors: Douglas C. Bossen, Wappingers Falls; Mu-Yue Hsiao, Poughkeepsie, both of N.Y.; Arvin M. Patel, San Jose, Calif.

[73] Assignee: IBM Corporation, Armonk, N.Y.

[22] Filed: Aug. 19, 1974

[21] Appl. No.: 498,510

[52] U.S. Cl. ................ 340/146.1 AL; 235/153 AM

[51] Int. Cl. ......................... H04l 1/10; G11c 29/00

[58] Field of Search..... 235/153 AM; 340/146.1 AL

[56] References Cited

UNITED STATES PATENTS

| | | | |
|---|---|---|---|
| 3,629,824 | 12/1971 | Bossen | 340/146.1 AL |
| 3,697,948 | 10/1972 | Bossen | 340/146.1 AL |
| 3,745,528 | 7/1973 | Patel | 340/146.1 AL |
| 3,786,439 | 1/1974 | McDonald et al. | 340/146.1 AL |

*Primary Examiner*—Malcolm A. Morrison
*Assistant Examiner*—R. Stephen Dildine, Jr.
*Attorney, Agent, or Firm*—James E. Murray

[57] ABSTRACT

This specification describes an error correction system for a high density memory made up of a number of monolithic wafers each containing a plurality of arrays that are addressed thru circuitry and wiring contained on that wafer. The storage bits on the wafers are functionally divided into a number of blocks each containing a plurality of words. The words of each block are on several wafers with each word made up of a plurality of arrays on a single array wafer. Each word in a block is protected by a similar error correction double multiple error detection code. The block is further protected by two additional check words made up using a b-adjacent code. Each byte in the check words protects one byte position of the words of the block. When a single error is detected in any word by the SEC-MED code the code corrects the error. If a multiple error is detected, the multiple error signal points to the word in error to be corrected by the b-adjacent code check words.

5 Claims, 4 Drawing Figures

MULTI LEVEL ERROR CORRECTION SYSTEM FOR HIGH DENSITY MEMORY

BACKGROUND OF THE INVENTION

The present invention relates to error correction systems and more particularly to error correction systems to be used with high density solid state storage systems.

With the advent of high density solid state storage systems, the problems of error detection and correction have become more complex. For example in storage systems made up of a number of whole monolithic wafers, each containing a plurality of arrays with the wiring and circuitry for addressing those arrays, the configuration of the memory can be such that a single array on a wafer word constitutes a good portion of all the bits in the array of the memory. Therefore, the failure of an array in the memory would not be corrected by use of standard single error and double error correction schemes.

THE INVENTION

Therefore, in accordance with the present invention a code on code technique is employed using multiple levels of codes to correct for different types of errors. First of all, each word of the memory is protected by a single error correction multiple error detection SEC-MED scheme by the addition of check bits to the words so that single errors in the words are handled first. This provides quick correction of most errors using the single error correction SEC capacity of the code. Furthermore it generates reliable pointers to words affected by multiple errors by means of a powerful multiple error detection, "MED" capability of the SEC-MED code. These pointers are used in correcting up to one or more full words in error by grouping the words into secondary units and protecting them with *b*-adjacent check words with secondary units. Once a multiple error is detected in a word or words of the secondary group by the MED capability of the SEC-MED code the *b*-adjacent check words are used to regenerate the bytes in error up to and including all the bytes of the word or words in error.

Therefore it is the object of the present invention to provide a new error correcting coding system.

It is another object of the invention to provide a new multi-level error correcting coding system for solid state memory.

And, it is still another object of the invention to provide a new error detection and correction system having a first level code for correcting single errors in the words of memories and for detecting multiple errors in a word from memory and a second level *b*-adjacent code for correcting those words having multiple errors in them that have been detected by the first level code.

DESCRIPTION OF THE DRAWINGS

The foregoing and other objects, features and advantages of the present invention will be apparent from the following description of the preferred embodiment of the invention as illustrated in the accompanying drawings of which;

Referring now to FIG. 1, the layout of a typical array wafer 10 contains plurality of arrays 12 divided into two independent sections by a central segment 14 containing wiring and circuitry to address the arrays 12. This typical layout of the arrays on the chip is not important to the present invention. It is merely illustrative of the type of arrangement of high density packaging that can be used in combination with the present invention. What is of more immediate concern is the functional arrangement of the memory using this packaging.

Figure 1:
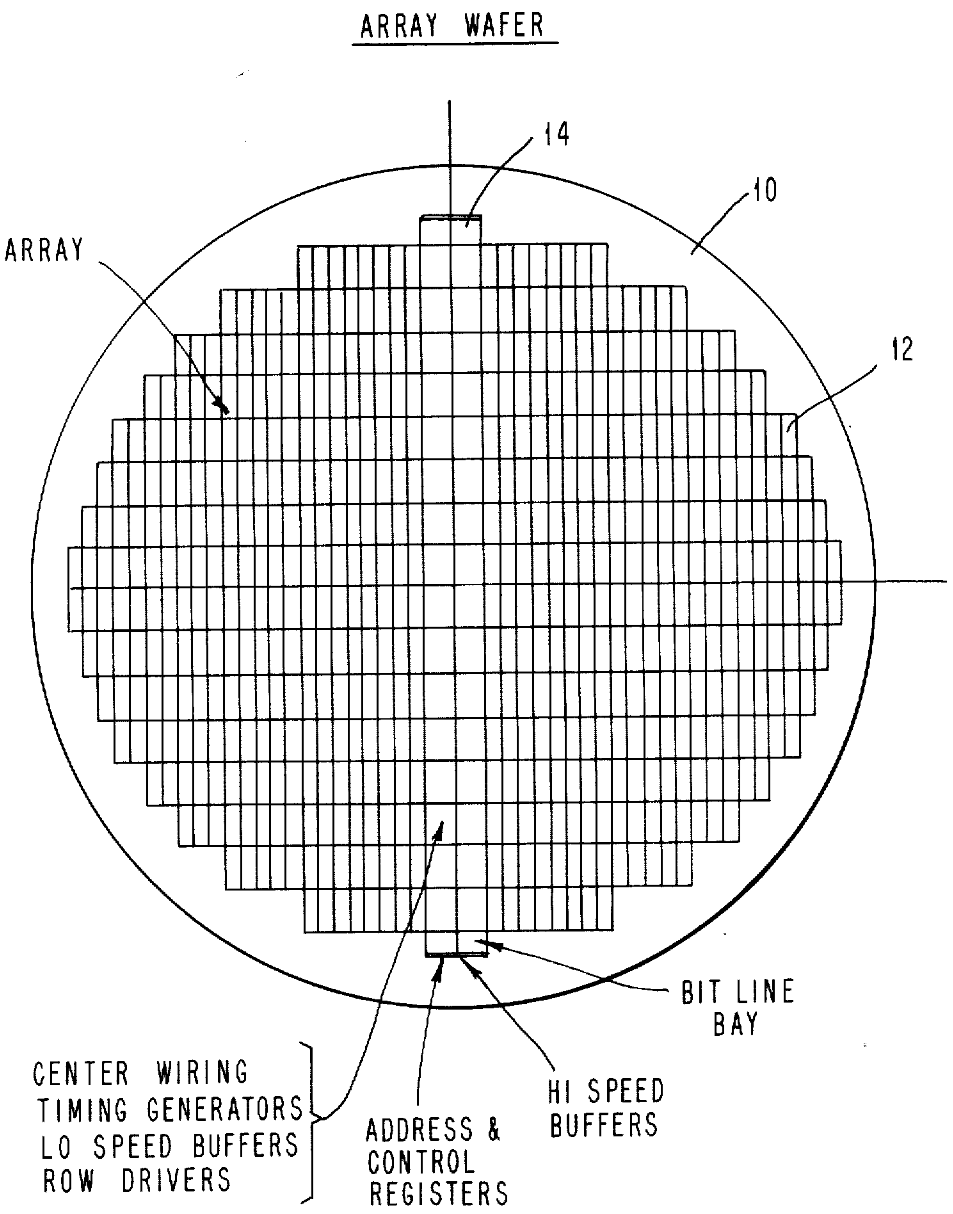
FIG. 1 is a plane view of a single monolithic memory wafer chip for use in a full wafer memory packet.
Figure 2:
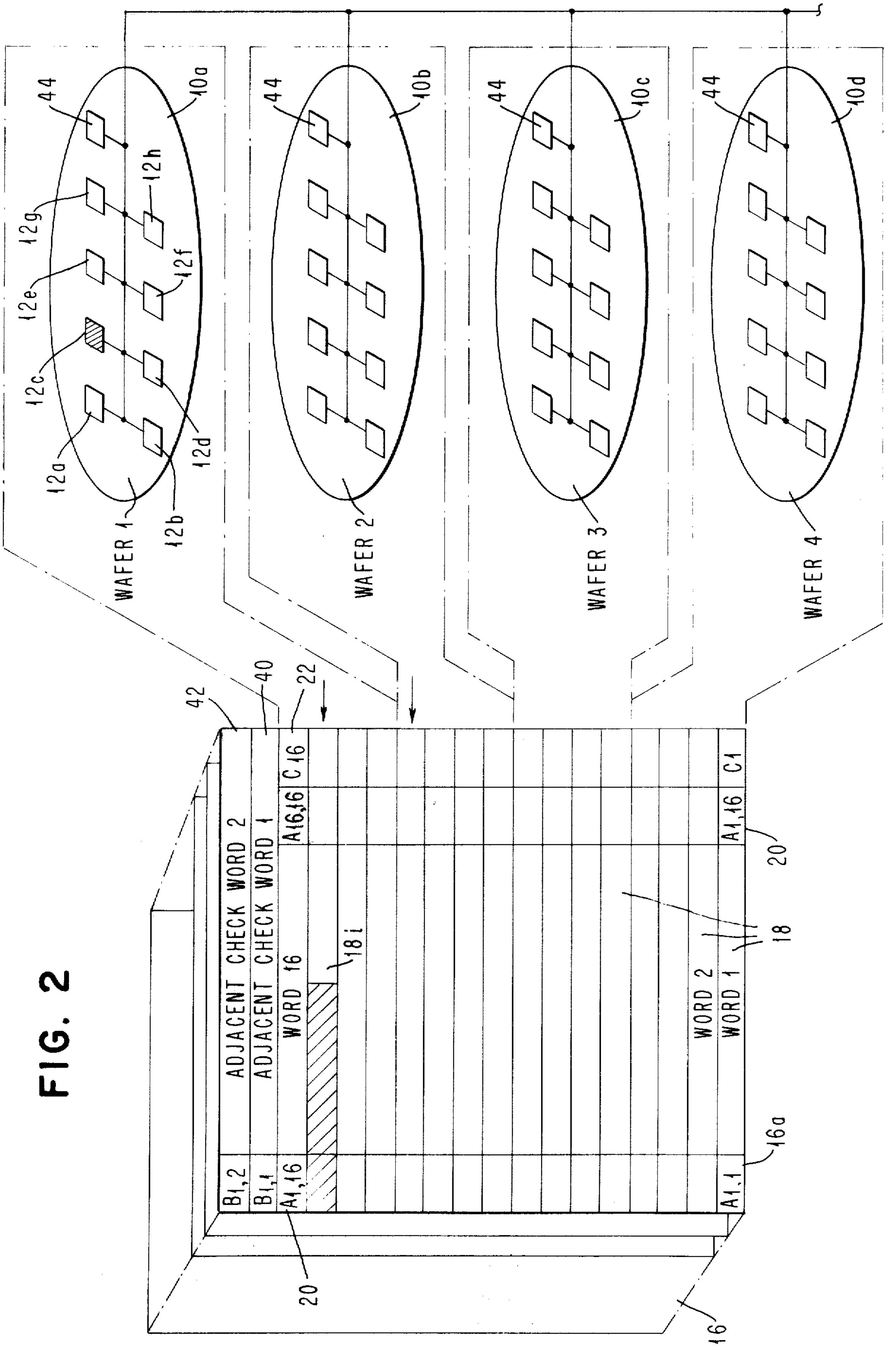
FIG. 2 is a schematic diagram showing how the arrays and the chips on them can be organized into a block and in accordance with the present invention, these blocks are protected by a multiple level code.

This functional arrangement is shown in FIG. 2. As shown, the stack of wafers 10 is divided functionally into a plurality of basic storage modules or blocks 16 of a memory. Each block 16 is made up of sixteen data words 18 containing 16 bytes 20 of data each. Each four words of any block **16*a* is contained on one of the wafers in the wafer stack with half the bytes 20 in any word 18*a* being in one array 12*c* so that a block is made up of thirty-two arrays divided equally between four wafers 10. Of course the wafers 10 contain other arrays 12 that make up words in other blocks 16 of the memory and there are other wafers 10 in the wafer stack also being used to make up words in blocks 16** of the memory.

Each one of the sixteen words 18 of the memory is protected by a single error correction, multiple error detection SEC-MED code which adds sixteen bits 22 to the length of the code word 18. The selected SEC-MED code is basically a double error correcting code of Hamming distance 5 (see article by A. M. Patel, M. Y. Hsiao entitled "An Adaptive Error Correction Scheme for Computer Memory System" that appeared in the 1972 proceedings of the Fall Joint Computer Conference. In the present invention the decoding scheme for this code is designed to correct only single errors and the extra capability of the code is used for multiple error detection.

Figure 3:
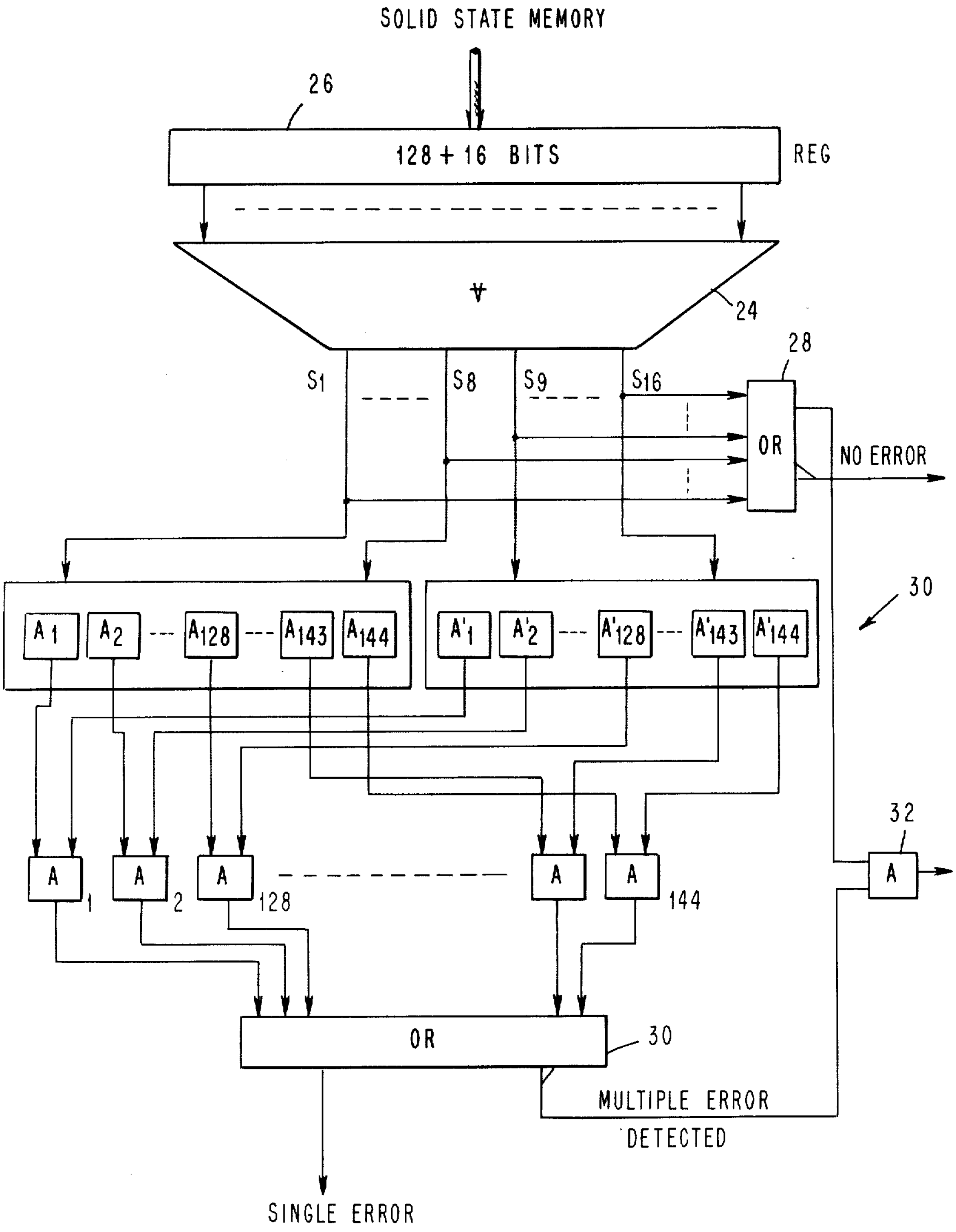
FIG. 3 is a block diagram of a decoder for the first level code showing how a multiple error detection signal can be generated; and, FIG. 4 is a schematic diagram of a 3-level error correction system in accordance with the present invention.

The code matrix to do this is identified herein. The first 16 lines in the matrix show the syndrome patterns from the syndrome generator 24 in FIG. 3 showing one of the check bits is in error. The remaining lines of the matrix are combinations of syndrome signals from the decoder 24 of FIG. 3 that indicate a single error has occurred in the word loaded into the register. Any other combination of ones and zeros for the syndromes S1 to S16 indicates that a multiple error has occurred. While if all the syndromes S1 to S16 are equal to zero it indicates that no error has occurred. Thus OR circuit 28 provides an indication of an error occurring when its output is one and indicates no error has occurred when its output is zero.

To determine whether this error is a single error or a multiple error the output of decoder 30 is examined. Decoder 30 is made up of AND gates to decode the 16 bit syndrome signal into a single array one on one of the 144 ones when the 16 bit syndrome signal is one of the combinations listed in the matrix. Each of the 144 lines represents one of the 138 data bits and 16 check bits. Therefore, by Exclusive ORing this signal with the contents of the data register 26 bit position a word with a single error can be corrected. If an error is indicated by OR circuit 28 and all 144

FIRST LEVEL CODE MATRIX

| | | |
|---|---|---|
| 000*1000000000000000 | 054*1000010110001100 | 111*1001001110111111 |
| 001*0100000000000000 | 055*0100001011000110 | 113*0111111100110111 |
| 002*0010000000000000 | 056*0010000101100011 | 114*1000100000101010 |
| 003*0001000000000000 | 057*1010011100000000 | 115*0100010000010101 |
| 004*0000100000000000 | 058*0101001110000000 | 116*1001010110111011 |
| 005*0000010000000000 | 059*0010100111000000 | 117*1111110101101100 |
| 006*0000001000000000 | 060*0001010011100000 | 118*0111111010110110 |
| 007*0000000100000000 | 061*0000101001110000 | 119*0011111101011011 |
| 008*0000000010000000 | 062*0000010100111000 | 120*1010100000011100 |
| 009*0000000001000000 | 067*0101101111110001 | 121*0101010000001110 |
| 010*0000000000100000 | 068*1001101001001001 | 122*0010101000000111 |
| 011*0000000000010000 | 069*1111101010010101 | 123*1010001010110010 |
| 012*0000000000001000 | 070*1100101011111011 | 124*0101000101011001 |
| 013*0000000000000100 | 071*1101001011001100 | 125*1001111100011101 |
| 014*0000000000000010 | 072*0110100101100110 | 126*1111100000111111 |
| 015*0000000000000001 | 073*0011010010110011 | 127*1100101110101110 |
| 016*1011011110110001 | 074*1010110111101000 | 128*0110010111010111 |
| 017*1110110001101001 | 075*0101011011110100 | 131*1001011011100111 |
| 018*1100000110000101 | 076*0010101101111010 | 132*1111110011000010 |
| 019*1101011101110011 | 077*0001010110111101 | 135*1111001111110001 |
| 020*1101110000001000 | 078*1011110101101111 | 136*1100111001001001 |
| 021*0110111000000100 | 079*1110100100000110 | 137*1101000010010101 |
| 022*0011011100000010 | 080*0111010010000011 | 138*1101111111111011 |
| 023*0001101110000001 | 081*1000110111110000 | 139*1101100001001100 |
| 024*1011101001110001 | 082*0100011011111000 | 140*0110110000100110 |
| 025*1110101010001001 | 083*0010001101111100 | 141*0011011000010011 |
| 026*1100001011110101 | 084*0001000110111110 | 147*0101111010111101 |
| 027*1101011011001011 | 086*1011001111011110 | 148*1001100011101111 |
| 031*1010110000101011 | 087*0101100111101111 | 149*1111101111000110 |
| 032*1110000110100100 | 088*1001101101000110 | 150*0111110111100011 |
| 033*0111000011010010 | 089*0100110110100011 | 151*1000100101000000 |
| 034*0011100001101001 | 090*1001000101100000 | 153*0010001001010000 |
| 035*1010101110000101 | 091*0100100010110000 | 158*1011011010100011 |
| 036*1110001001110011 | 092*0010010001011000 | 160*0111011001110000 |
| 037*1100011010001000 | 093*0001001000101100 | 161*0011101100111000 |
| 038*0110001101000100 | 094*0000100100010110 | 162*0001110110011100 |
| 039*0011000110100010 | 096*1011010111110100 | 163*0000111011001110 |
| 040*0001100011010001 | 097*0101101011111010 | 164*0000011101100111 |
| 041*1011101111011001 | 098*0010110101111101 | 165*1011010000000010 |
| 045*0110101101111111 | 099*1010000100001111 | 171*1101111011011000 |
| 046*1000001000001110 | 100*1110011100110110 | 172*0110111101101100 |
| 047*0100000100000111 | 101*0111001110011011 | 176*0101110100101110 |
| 048*1001011100110010 | 102*1000111001111100 | 177*0010111010010111 |
| 049*0100101110011001 | 103*0100011100111110 | 178*1010000011111010 |
| 050*1001001001111101 | 105*1010011001111110 | 179*0101000001111101 |
| 051*1111111010001111 | 107*1001111000101110 | 182*0111110000111011 |
| 052*1100100011110110 | 108*0100111100010111 | 189*1010001101100001 |
| 053*0110010001111011 | 109*1001000000111010 | 190*1110011000000001 |

lines are zero, a multiple error condition is indicated. Thus the inverted output of the OR circuit 30 is ANDed with the output of OR gate 28 in AND gate 32 provides an indication that a multiple error condition is detected. The multiple error detection capability of this indication code is that it will recognize 99.8 percent of all multiple errors including 100 percent of all double errors, 100 percent of all triple errors and 100 percent of all burst errors of 8 bits or less.

This highly reliable indicator of multiple error in the word is used as a pointer for second and third level error correction codes. Referring again to FIG. 2 we can see how the second and third level *b*-adjacent error correction code words 40 and 42 generated in accordance with Patel U.S. Pat. No. 3,745,528 are configured. The *b*-adjacent code words may also be generated in accordance with Bossen U.S. Pat. No. 3,629,824 and Bossen U.S. Pat. No. 3,697,948. The latter provides the capability of correcting two words with error pointers using the same two check words described in the present application. These variations will be appreciated to those skilled in the art as being in keeping with the spirit of the present invention. The check words are stored in different arrays 44 than the arrays 12 containing data words 18 for the BSM 16*a* and first level check bits 22 for those words 18. The check bits for the both *b*-adjacent check words 40 and 42 protect the data words 18 and the check bits for the data words 18 on a byte by byte basis, where a byte equals *b* bits. Thus, the first check byte equals 8 bits in the words 40 and 42 protects the first data byte of all the words in the BSM while the second check byte in both the *b*-adjacent check words 40 and 42 protects the second data byte in each of the 16 words of the BSM and so on for each of the 18 data and check byte positions. The following is the matrix for the *b*-adjacent error correction codes.

$$H = \left[\begin{array}{cccccc} 1 & 1 & \ldots & 1 & 1 & \phi \\ \hline T & T^2 & \ldots & T^{16} & \phi & I \end{array}\right] \begin{array}{l} \text{b-adjacent code word 1} \\ \text{b-adjacent code word 2} \end{array}$$

With this matrix in mind, let $A_{pq}$ represent the $p^{th}$ byte of the $q^{th}$ word in a block where $p = 1,2, \ldots ,N$ and $q = 1,2, \ldots ,M$. Then, $A_{p,1}$ $A_{p,2}, \ldots ,A_{p,16}$ are used in computations of check bytes $B_{p,1}$ and $B_{p,2}$. These check bytes for all values of $p$ then form two check words. The check byte computations are affected according to the following matrix equations:

$$B_{p,1} = A_{p,1} \oplus A_{p,2} \oplus A_{p,3} \oplus \ldots, \oplus A_{p,M} \qquad 1$$

$$B_{p,2} = T\, A_{p,1} \oplus T^2\, A_{p,2} \oplus T^3\, A_{p,3} \oplus \ldots, \oplus T^M A_{p,M} \qquad 2$$

where $\oplus$ represents modulo 2 sum of vectors by elements and T is the companion matrix of a primitive binary polynomial $g(x)$ of degree $i$ and $T^i$ represents the $i^{th}$ power of matrix T. For the primitive polynomial $$g(x) = 1 + x + x^3 + x^5 + x^8 \qquad 3$$

The companion matrix T is given by $$T = \begin{bmatrix} 0&0&0&0&0&0&0&1 \\ 1&0&0&0&0&0&0&1 \\ 0&1&0&0&0&0&0&0 \\ 0&0&1&0&0&0&0&1 \\ 0&0&0&1&0&0&0&0 \\ 0&0&0&0&1&0&0&1 \\ 0&0&0&0&0&1&0&0 \\ 0&0&0&0&0&0&1&0 \end{bmatrix} \qquad (4)$$

In decoding, the syndrome generation computations are affected according to the following matrix equations for the syndromes $S_{p,1}$ and $S_{p,2}$ $$S_{p,1} = \hat{B}_{p,1} \oplus \hat{A}_{p,1} \oplus \hat{A}_{p,2} \oplus \ldots, \oplus \hat{A}_{p,M} \qquad 5$$

$$S_{p,2} = \hat{B}_{p,2} \oplus T\, \hat{A}_{p,1} \oplus T^2\, \hat{A}_{p,2} \oplus \ldots, \oplus T^M\, \hat{A}_{p,M} \qquad 6$$

where indicates that these bytes could be in error. Suppose the $i^{th}$ and $j^{th}$ words are in error with $e_{p,i}$ and $e_{p,j}$ denotes the corresponding error patterns in their $p^{th}$ bytes. Then the error equations are given by the following matrix equations:

$$S_{p,1} = e_{p,i} \oplus e_{p,j} \qquad 7$$

$$S_{p,2} = T^i e_{p,i} \oplus T^j e_{p,j} \qquad 8$$

If the values of $i$ and $j$ are provided by means of the pointers from the first level code, then equations (7) and (8) can be solved for $e_{p,i}$ and $e_{p,j}$ as follows:

$$e_{p,i} = [\, S_{p,1} \oplus T^{-j}\, S_{p,2}\,]\, [\, I \oplus T^{j-i}\,] \qquad 9$$

$$e_{p,i} = S_{p,1} \oplus e_{p,j} \qquad 10$$

Figure 4:
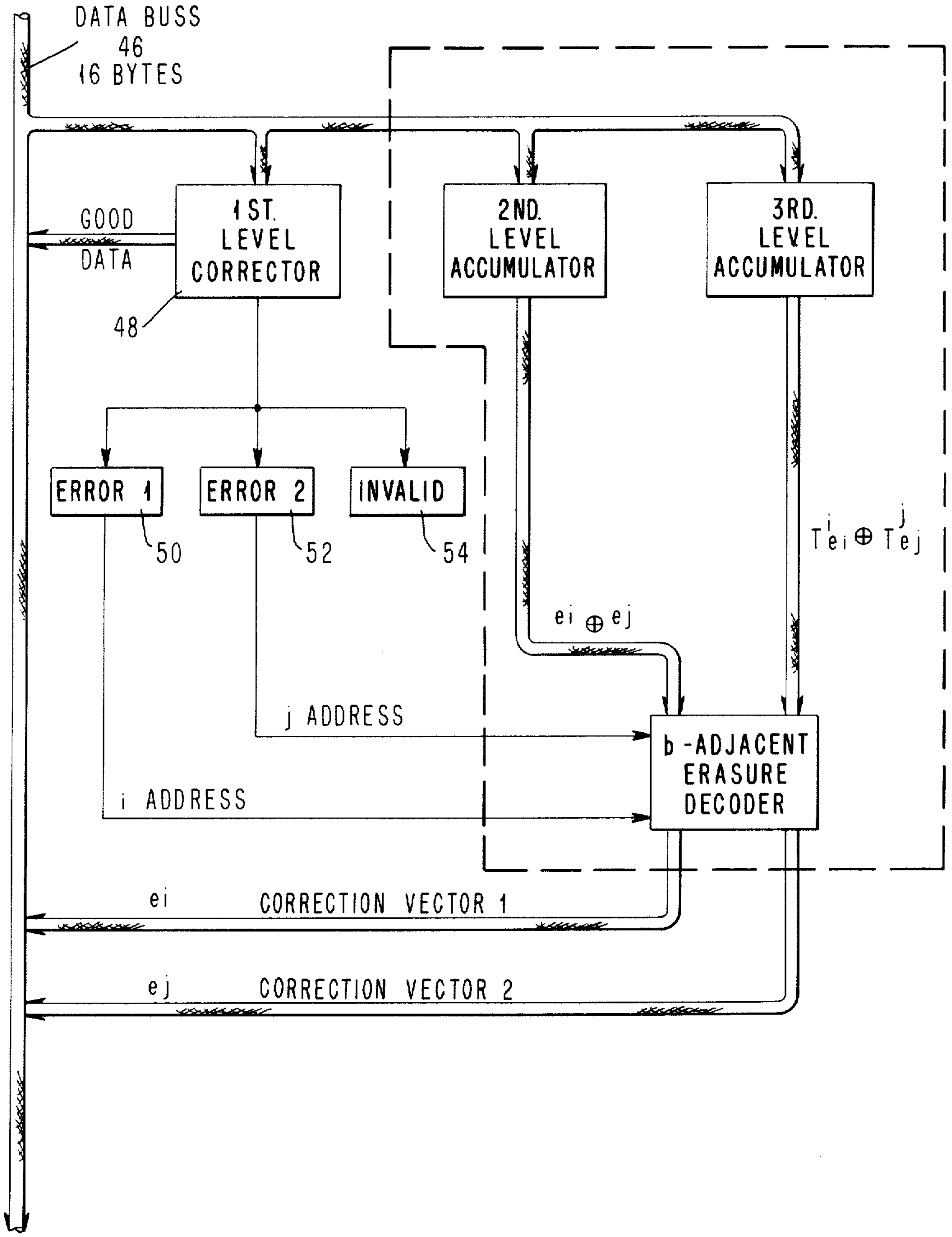

The encoding and decoding of this code comprises of realization of equations 1, 2 and equations 5, 6, 9, and 10 respectively. This can be done by means of a set of two 8-stage shift registers for each of the 18 bytes of the code words 18. These sets of shift registers for performing this function are shown in FIGS. 4 and 5 of the above mentioned Patel U.S. Pat. No. 3,745,528 and the use of the shift registers described in the specification of that patent. Of course there would be eighteen sets of shift registers as mentioned above instead of the one set shown and described in the Patel patent.

The system of error detection as shown will therefore correct single errors in up to all sixteen words of the block through the use of the SEC portion of the SEC-MED code and correct up to two full words in the block using the second and third level *b*-adjacent code words in combination with the pointers provided by the MED portion of the SEC-MED code. As shown in FIG. 4, the bits of each word 16 of the block are fed from bus 46 in parallel into the register 28 of the single error correction circuitry 48. All the words 16 containing good data are placed back onto the bus by the first level correction and all words 16 containing only 1 bit in error are corrected and placed back on the bus by the first level corrector 18.

This process continues checking one word at a time until all the words in a block have been examined by the first level corrector. If any of the words in the block contain more than one error, the MED portion of the code identifies these multi error words described in connection with FIG. 3 and their address is stored in a register while the first level corrector is processing the block. The first word in error placed in register 50, the second word in error placed in register 52 and the third word in error is placed in register 54. While the first level corrector was correcting all the words in the block, accumulators 56 and 58 of the type mentioned previously in connection with Patel U.S. Pat. No. 3,745,528 were accumulating the bytes of the words of the block byte by byte to generate the $S_1$ and $S_2$ syndromes for the second and third level codes. Upon completion of the operation the first level indicator 48, these syndromes $S_1$ and $S_2$ are fed into the correction circuitry 60 described in the mentioned Patel patent to correct up to two full words in error in the manner described in the Patel patent. If it turns out that there is a multiple error in only one word of the BSM the syndrome $S_1$ is used to correct the bits in error in that word immediately while if two words are in error both syndromes $S_1$ and $S_2$ are used to correct the words in error as described in the Patel patent. If more than two words are in error, an invalid signal is generated by the error correction circuitry to indicate that the words of the BSM are uncorrectable with the error correcting system.

Above we have described one embodiment of the invention. Of course, numerous changes can be made in this invention without departing from the spirit and scope of the invention; for instance, as pointed out above the coding and decoding of the *b*-adjacent code words may be done in accordance with the mentioned Bossen patents instead of the Patel patent. In addition, a third *b*-adjacent check word could be employed so that at least three words could be corrected by the described error correcting system. Therefore, it should be understood by those skilled in the art that the foregoing and other changes in form and details may be made therein without departing from the spirit and scope of the invention.

What is claimed is:

1. In a random access memory system of the type that is functionally divided into units of storage each containing a plurality of data words with each word storing a number of bits of different arrays, an error correcting system comprising:

a first level error correction means including a SEC-MED code means adding a plurality of check bits to each data word in and out of storage to form a SEC-MED code word for correcting a single bit in error of each of the SEC-MED code words generated from the plurality of data words in the unit of storage on a word for word basis and providing a pointer for each SEC-MED code in the unit of storage containing more than one error;

second and third level error correction means adding additional code words to the units of storage for protecting said SEC-MED code words of the unit of storage on a cross word basis each byte of both additional code words being a check on one byte position in all of the words in the plurality of words, where each check byte of the first additional code word $B_{p,1} = A_{p,1} \oplus A_{p,2} \oplus A_{p,3} \oplus \ldots \oplus A_{pM}$ and each check byte of the second additional code word $B_{p,2} = T A_{p,1} \oplus T^2 A_{p,2} \oplus T^3 A_{p,3} \oplus \ldots \oplus T^M A_{p,M}$;

second level accumulator level means for generating the syndrome $S_{p,1} = \hat{B}_{p,2} \oplus T \hat{A}_{p,1} \oplus T^2 \hat{A}_{p,2} \oplus \ldots \oplus T^M \hat{A}_{p,M}$ for each data byte position in the SEC-MED code words of the unit of storage while the first level error corrector is correcting single errors in the words;

third level accumulating means for generating the syndrome $S_{p,2} = \hat{B}_{p,2} \oplus T \hat{A}_{p,1} \oplus T^2 \hat{A}_{p,2} \oplus \ldots \oplus T^M \hat{A}_{p,M}$ for each data byte position in the SEC-MED code words of the unit of storage while the first level corrector is correcting single errors in the syndrome, and, second and third level error correction means for correcting words containing multiple errors using the syndromes generated by the first and second level accumulator means and the pointers generated in the first level error correction means after the first level error correction means has corrected those words containing single errors.

2. The error correcting system of claim 1 wherein said SEC-MED code is a Hamming distance 5 code.

3. The error correcting system of claim 1 wherein said second and third level error correction means and said second and third level accumulator means includes means for generating correction bits and syndrome bits for the check bits in the SEC-MED code words.

4. The error correcting system of claim 1 wherein said error correction code words are stored in different arrays than the SEC-MED code words.

5. The error correcting system of claim 1 wherein said check bits of the SEC-MED code words are stored in the same arrays as the data bits of the SEC-MED code words.

* * * * *